United States Patent [19]
Deitrick

[11] 3,711,870
[45] Jan. 23, 1973

[54] ARTIFICIAL LENS IMPLANT
[76] Inventor: Rollin E. Deitrick, 1020 Deepwood Court, Winston-Salem, N.C. 27104
[22] Filed: Dec. 7, 1971
[21] Appl. No.: 205,626

[52] U.S. Cl. .................................................. 3/13, 3/1
[51] Int. Cl. ............................. A61f 1/16, A61f 1/24
[58] Field of Search ...................... 3/1, 13; 351/160

[56] References Cited

UNITED STATES PATENTS 2,952,023  9/1960  Rosen .......................................... 3/13

OTHER PUBLICATIONS

"A Weightless Iseikonic Intraocular Lens" by G. W. Weinstein et al., American Journal of Ophthalmology, Vol. 58, No. 1, July 1964, pages 73–78, FIGS. 3 and 4 relied upon.
"Artificial Corneal Endothelium Tested", Journal of the American Medical Assoc., Vol. 198, No. 6, Nov. 7, 1966, pages 40–41.

*Primary Examiner*—Richard A. Gaudet
*Assistant Examiner*—Ronald L. Frinks
*Attorney*—W. L. Williamson

[57] ABSTRACT

A lens suitable for implantion in the eye is provided with a resilient flange and the flange is sutured to the ciliary muscle of the eye to position and retain the lens in the same position as the original lens.

2 Claims, 2 Drawing Figures

PATENTED JAN 23 1973

3,711,870

INVENTOR.
R. E. DEITRICK
BY
W. L. Williams
ATTORNEY

ARTIFICIAL LENS IMPLANT

BACKGROUND OF THE INVENTION

This invention relates to improvements in ophthalmology and in particular with the provision of an artificial lens transplant within the posterior chamber of the eye for refractive correction of cataracts.

As is well known, cataracts gradually cause blindness due to the original lens of the eye progressively becoming opaque. When the lens becomes sufficiently opaque, it becomes necessary to perform an intra-capsular operation to remove the lens. With the original lens removed, it becomes necessary to provide artificial lenses to focus images on the retina and restore useful vision.

Presently, it is the practice to provide powerful lenses mounted in spectacle frames to provide the necessary correction. However, there are many disadvantages to this solution. For example, the lenses are quite heavy, peripheral vision is restricted and binocular vision is not satisfactorily obtainable. Also, when the lens of only one eye is removed, proper focusing is virtually impossible to obtain.

There have been attempts to place an artificial lens within the eye, but heretofore this has not proven successful. For example, it has been proposed to float a lens within the eye on the vitreous humor in essentially the same position as the original lens. The difficulty with this solution is that the lens is susceptable to objectionable movement and may sink into the vitreous humor. It has also been proposed to mount a lens in the anterior chamber. The difficulty with this situation is that the lens does not have the same position as the original lens and damage to the eye results from the mounting of the lens in this forward position.

SUMMARY OF THE INVENTION

It has been discovered that by providing a lens with a resilient flange, the flange can be sutured to the ciliary muscle to position the lens radially and axially thereby retaining the lens in the same position as the original lens, i.e., directly behind the iris in the posterior chamber. It has been found that the resilient flange absorbs any shocks experienced by the eye and does not damage the eye when attached to the ciliary muscle.

DESCRIPTION OF THE DRAWING

Referring now to the drawing.

DETAILED DESCRIPTION

Figure 1:
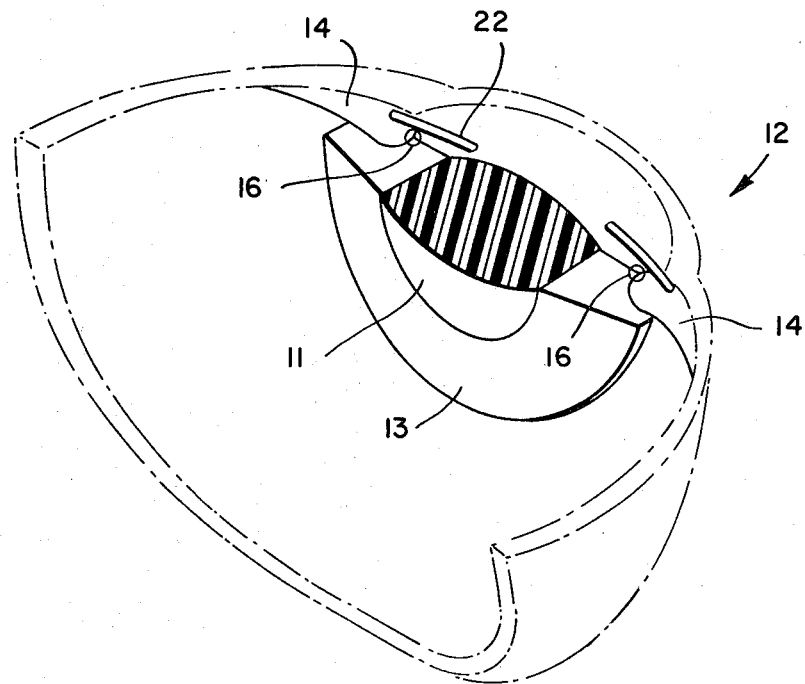
FIG. 1 illustrates the human eye with portions cut away to show an artificial lens embodying the principles of this invention mounted in the same position as the original lens.

Referring now to FIG. 1, a lens 11 may be positioned in the same position as the original lens by providing the lens 11 with a flange 13 and suturing the flange to the ciliary muscle 14 with sutures 16—16 to retain the lens in the desired position. As will be appreciated, the lens 11 and flange 13 should be non-toxic and non-irritating to the eye and should be inert, i.e., not susceptable to being absorbed by body fluids. Any suitable optical grade plastic or optical glass can be employed for the lens 11. For example, Methyl methacrylate resins such as those available under the trade name "Lucite" and "Plexiglass" have been found particularly suitable. The material used for the flange 13 should also be resilient so that any shocks experienced by the eye will be absorbed by the flange without damage to the eye. A medical grade adhesive silicone such as that sold by Dow Corning as Type A under the trademark "Silastic" may be advantageously used.

Figure 2:
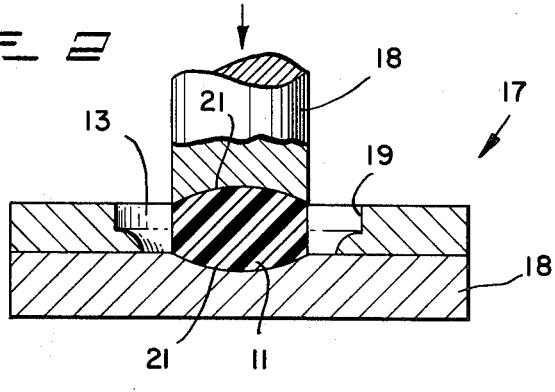
FIG. 2 illustrates a fixture suitable for forming a flange on the lens.

When a medical grade adhesive silicone is employed, the flange 13 is readily formed by using a fixture 17 as illustrated in FIG. 2. The fixture 17 is provided with mounting members 18—18 for holding the lens 11 in position within mold cavity 19 while covering lens surfaces 21—21. The mold cavity is then filed with the adhesive silicone which cures at room temperature to form a resilient flange 13 about the lens 11 which is tenaciously bonded thereto.

The lens 11 having the flange 13 formed thereabout is position within the posterior chamber of the eye during the intra-capsular operation directly after removal of the original lens. The lens is aligned radially and axially to position the lens in the same position as the original lens, i.e., in the posterior chamber directly behind iris 22 and in front of the vitreous humor. The flange 13 engages the ciliary muscle 14 and is sutured thereto to retain the lens in the desired position. As will be appreciated, the resiliency of the flange protects the eye from damage while permitting retention of the lens in the same position as the original lens.

What is claimed is:

1. A lens for implantation in the posterior chamber of the eye in the same position as the original lens, comprising:

a resilient flange tenaciously bonded to the lens, said lens and said flange being made from material that is non-toxic and non-irritating to the eye, said resilient flange extending continuously around the outer periphery of said lens and being sized for close contact with the ciliary muscle of the eye, whereby said flange is adapted to be sutured to the ciliary muscle of the eye to retain the lens in the same position as the original lens.

2. The lens of claim 1 wherein the flange is an adhesive silicone.

* * * * *